T. SCHTSCHERBAKOFF.
METHOD OF UTILIZING HEAT OF COMBUSTION AND STEAM POWER IN PRIME MOVERS.
APPLICATION FILED SEPT. 10, 1904.
925,845.
Patented June 22, 1909.
2 SHEETS—SHEET 1.
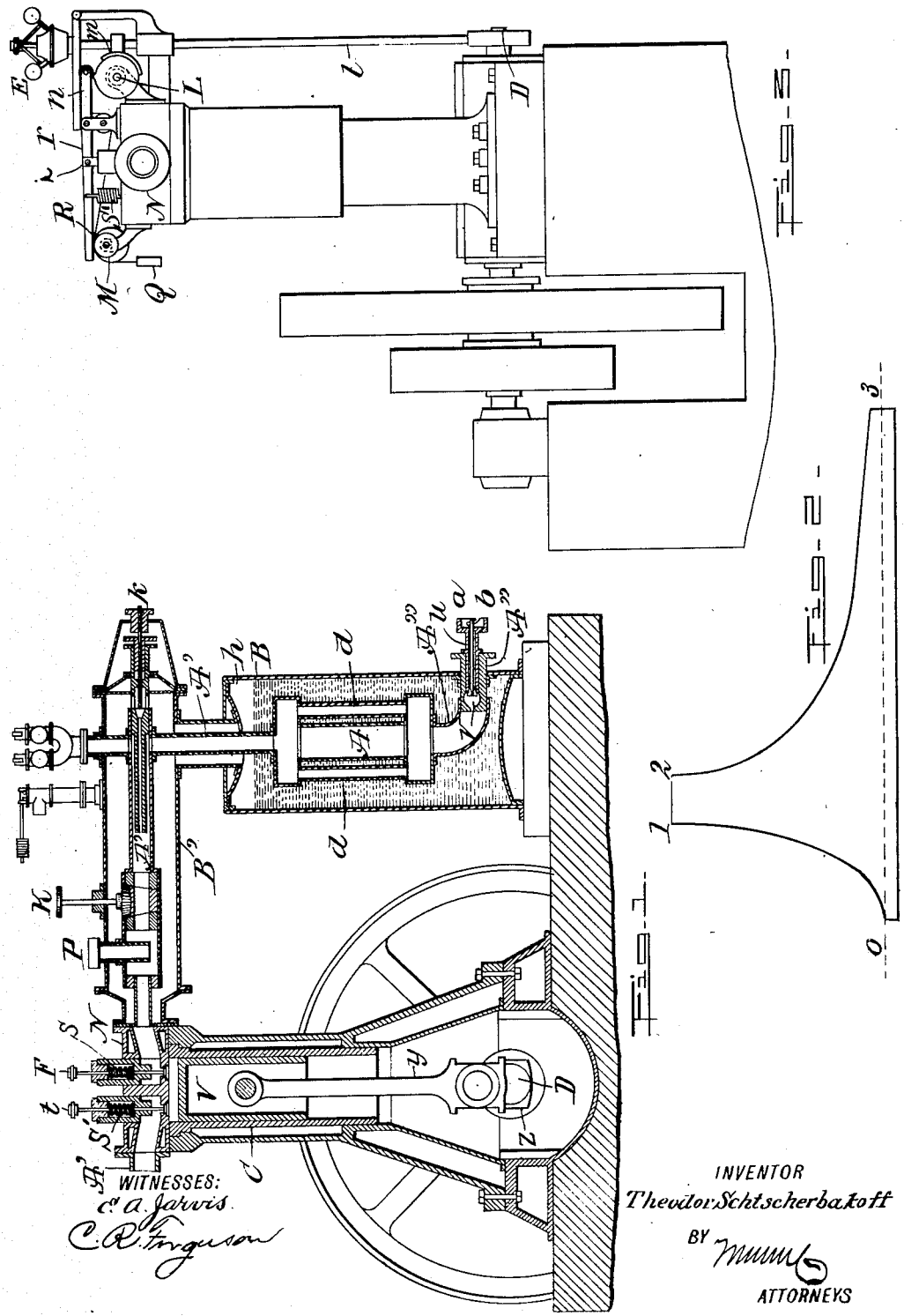
INVENTOR
Theodor Schtscherbakoff
BY
ATTORNEYS T. SCHTSCHERBAKOFF.
METHOD OF UTILIZING HEAT OF COMBUSTION AND STEAM POWER IN PRIME MOVERS.
APPLICATION FILED SEPT. 10, 1904.
925,845.
Patented June 22, 1909.
2 SHEETS—SHEET 2.
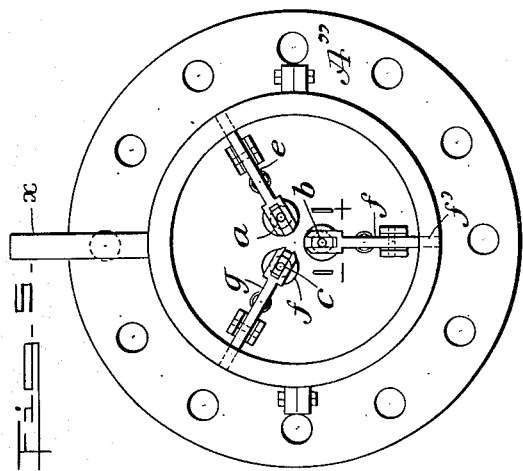
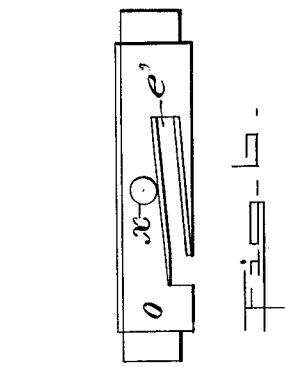
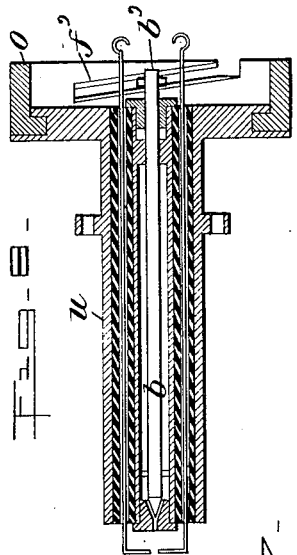
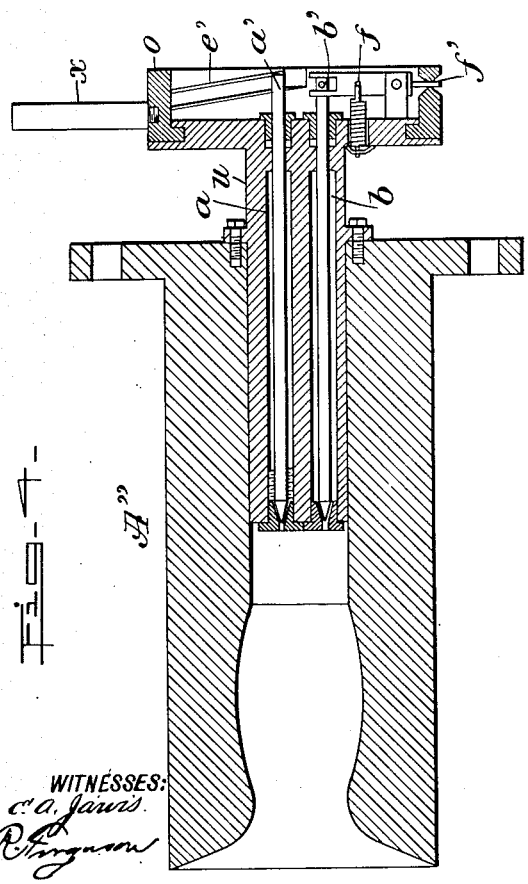
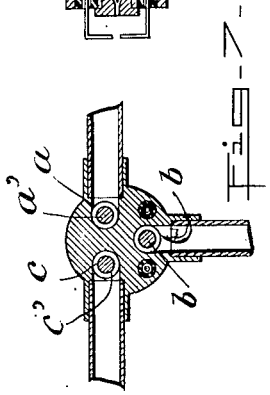
WITNESSES:
INVENTOR
Theodor Schtscherbakoff.
BY
ATTORNEYS

UNITED STATES PATENT OFFICE.

THEODOR SCHTSCHERBAKOFF, OF MOSCOW, RUSSIA.

METHOD OF UTILIZING HEAT OF COMBUSTION AND STEAM-POWER IN PRIME MOVERS.

No. 925,845. Specification of Letters Patent. Patented June 22, 1909.

Application filed September 10, 1904. Serial No. 224,047.

*To all whom it may concern:*

Be it known that I, THEODOR SCHTSCHERBAKOFF, a subject of the Emperor of Russia, and a resident of Moscow, Russia, have invented certain new and useful Improvements in the Method of Utilizing the Heat of Combustion and Steam-Power in Prime Movers, of which the following is a full, clear, and exact description.

I will describe the method of utilizing the heat of combustion and steam power in prime movers, and then point out the novel features in the appended claims.

Reference is to be had to the accompanying drawings, forming a part of this specification, in which similar characters of reference indicate corresponding parts in all the figures.

There are two methods at present for utilizing the heat of combustibles for obtaining motive force; first, in which combustion vaporizes liquids and steam so formed expands, and, second, in which direct combustion takes place in the motor cylinders. The first of these methods of utilizing heat, while having valuable advantages consisting in a more regular running of the motor, has a substantial drawback in that its co-efficient of efficiency only constitutes 5 to 17% of the heat equivalent of the combustible. The second method of utilizing the heat has undergone such profound study for the last quarter of a century, that motors of this type can at present convert into useful work from 25 to 30% of the heat equivalent of the combustibles consumed.

The method of utilizing the heat of the combustibles forming the object of the present invention consists in combining the first of these methods with the second, the work of the motors of the second type which is actually produced in one cylinder, being divided into three periods, namely: 1st period: compression of air in the compressor; 2nd period: combustion of the substances under pressure in a combustion tube or chamber of a gas or steam boiler; 3rd period: action of the products of combustion and steam in a motor of special construction enabling the mixture of gas and steam to be superheated up to a temperature of 200–400–500° and even beyond.

The process of combustion of the substances and the useful work obtained therefrom may be represented by a diagram as shown in Figure 2. During the period indicated by the curved line 0—1 atmospheric air is compressed by aid of a compressor up to 5 atmospheres and even beyond, whereafter it is fed together with combustible by pipes into a combustion tube or chamber of a gas and steam boiler of vertical, horizontal or inclined type, where the mixture is ignited by the processes hereinafter described.

The heat given off by the combustion serves partly for heating the products of combustion and partly for superheating the steam drawn from the gas and steam boiler, and introduced into the gaseous mixture of the products of combustion. The combustion, the evaporation of water, the supply of air to the products of combustion and the increase of their volume are taking place between points 1 and 2 of the diagram, Fig. 2.

The curved line between points 2—3 (Fig. 2) shows the expansion of the mixture of gas and steam in the heat motor adapted to work by means of a like mixture at a temperature exceeding 300°. Any suitable combustible may be employed in this process whatever its physical condition; it may be introduced into the combustion tube or chamber, in the case of liquid or gaseous combustibles, under pressure and broken up or atomized by an injector, and, in case of solid combustibles, by direct mechanical means in a comminuted condition, or finally in a gaseous state from a Dawson or other gas generator by means of an injector.

This process allows of rotary motors being used, or reciprocating motors having one, two or more vertical or horizontal cylinders, and one or more pistons governing the driving shaft with simple or multiple expansion and with or without condensation of the exhaust products.

In the accompanying drawings, Fig. 1 is a vertical section of a gas and steam boiler and of the motor appertaining thereto; Fig. 2 is the already mentioned diagram; Fig. 3 is a side elevation of the motor; Fig. 4 is a longitudinal section of the supply pipe carrying the injectors, drawn on enlarged scale; Fig. 5 is a side view of Fig. 4; and Figs. 6, 7, 8 indicate details of the injectors and regulating levers.

The right side of Fig. 1 represents the gas and steam boiler in vertical section. The same has in its interior a combustion tube or chamber A connected with a discharge pipe A' provided with a valve K for intercepting the passage of the mixture of gas and vapor; further, with a pyrometer P for observing the temperature of this mixture, and, finally, with a valve $k$ for adding the steam drawn from the boiler to the products of combustion; the opposite end of the combustion chamber A is provided with an extension or connecting pipe A″ leading to three injectors $a$, $b$, $c$ for the admission of air and steam at a pressure of 5 atmospheres and upward to the combustion chamber.

The combustion chamber A and a portion of the pipe A′ are surrounded by a casing or shell B; the space comprised between the chamber and the casing communicates by a neck or narrow pipe with a steam collector B′ surrounding the other part of the discharge pipe A′ above referred to.

The combustion chamber A is constituted by a cylindrical, hermetically closed chamber, soldered or riveted, traversed by tubes $d$, and communicates at one end with the discharge pipe A′ and at the other end with the supply pipe or extension A″ having the two or three injectors. The combustion chamber A and said extension A″ are surrounded with a casing B which is filled with water up to near the level $h$. This casing is connected by a small pipe to the steam collector B′ which surrounds the pipe $d'$ and which is connected conjointly with this pipe to the gas or steam motor. In the front end of the injector extension A″ (Figs. 4, 5, 6, 7 and 8) three spraying or atomizing injectors are located; one—$a$, for the combustible (crude petroleum, gas or the like), another, $b$, for the air, and the third, $c$,—for the steam; these three injectors are arranged in an iron socket or plug $u$, common to all at 120° relative to one another, and connected by means of suitable piping (not represented in the drawings), the first with a reservoir of liquid combustible, gaseous or pulverulent, the second with a compressor or reservoir of compressed air, the third with the steam collector. The iron socket $u$ carries two insulated conducting wires (electrodes) which traverse it longitudinally.

In the longitudinal passage of the socket $u$ leading to the injectors are located rods or spindles $a'$, $b'$, $c'$ terminating in needle valves and serving to regulate the admission of the combustible, the air and the steam respectively. The valve rods are operated by levers $e$, $f$, $g$ which are actuated by a ring or collet O having oblique slots $e'$, $f'$, $g'$. By turning the ring O by means of its handle $x$ in one direction or the other, the rods are displaced forward or backward, enlarging or contracting more or less the discharge orifices of the injectors.

The interior of the first injector $a$ is threaded, serving to insure a better atomization of the liquid combustible. The combustible whether liquid, gaseous, or solid pulverulent, the two former arriving under pressure from a suitable reservoir and the latter being adapted to be fed by mechanical means, penetrate simultaneously with a suitable quantity of air by the first and second injectors $a$ and $d$ into the combustion tube or chamber.

The combustible and the oxygen of the air, chemically combining in presence of steam admitted by the third injector $c$, give off heat which serves both for vaporizing the water and for expanding the products of combustion and the steam admitted. The mixture of gas and steam thus obtained having a temperature above 300° serves for feeding one or more heat motors. The starting of the boiler may be effected in two ways: firstly, by means of an electric current, and, secondly, by heating the combustible and the air admitted by the injector $a$ and $b$.

According to the first method the combustible and air are introduced by the first and second injectors respectively, and the current of an induction coil fed by a battery of accumulators or cells, or from any other source, is passed through the + and − electrodes. The sparks which are formed between the ends of the electrodes ignite the gases and the combustion continues fed by the combustible and the admitted air. When the mouth of the pipe or extension leading to the injectors has reached a degree of incandescence sufficient to produce a spontaneous combustion of the combustible and the air, the current from the induction coil may be shut off and the boiler is ready for working, first by means of the products of combustion and the air, and then when the boiler has reached a certain pressure by means of a mixture of the products of combustion and steam. The second method of starting the boiler is carried out in the following way:

A blow pipe or torch is arranged below the tube of the second injector $b$ and the air is heated to a temperature sufficient to ignite the combustible admitted, then the first and second injectors are opened and the combustion which results is fed by the continuous admission of combustible and air; for the rest the operation is similar to what was hereinbefore described for the previous case.

The left side of Fig. 1 and the Fig. 3 show the construction of the gas and steam motor having a single cylinder C, this cylinder is open at the end turned toward the crank shaft, that is to say, it possesses on this side neither bottom nor cover; the opposite end is closed by a cover or a box N having two valves, an admission valve $t$ and an exhaust valve F. The box N communicates at one side with the pipe A′ and at the other side with the discharge pipe. The piston V of the plunger type, travels in the cylinder C and serves as a guide to the rod *y* which governs by means of a suitable crank *z* the motor shaft provided with a fly-wheel and pulley as usual.

The motor shaft D operates, by the intermediary of an endless screw or gearing, a vertical shaft *l* carrying a governor E and governing in its turn a horizontal distributing shaft L which latter carries two cams *n*, *m*, which open at given moments by the intermediary of the levers R and *r* the admission and exhaust valves respectively. These valves close again as soon as the cams have ceased to act on them, under the action of counter springs S. The motor works by the pressure of the mixture of gas and steam on the piston, this mixture by producing useful work and undergoing expansion is suitably cooled, and contrary to what takes place in the combustion motors existing, requires no refrigeration of the walls of the cylinder which on the contrary is provided with a steam casing and insulating covering.

The ascending course of the piston and the simultaneous expulsion of the exhaust mixture are produced by the impetus of the fly wheel acquired during the active course of the piston.

The admission and exhaust may be effected by distributing mechanisms of any suitable kind, for instance, such as those of Sultzer, Colman or the like, or even by means of the system represented in Fig. 3. The latter consists of a distributing shaft L having cams *n*, *m* keyed on it which by lifting suitable levers R and *r* operate the admission of the mixture of gas and steam. One of the ends of the arm or lever R bears on a cam M governed by the governor E of any construction, while the other end bears on the cam *n*. At an intermediate point of the lever R the rod of the valve *t* is pivoted, and the lever is drawn downward by two springs S', arranged on each side of the point at which this lever is pivoted and presses the valve on its seat. During the rotary movement of the distributing shaft the admission cam *n* raises the lever R and the valve *t*, and thus produces the admission of the mixture to the cylinder and the starting of the motor. The regulating of the speed of the motor is effected by an ordinary governor E which raises or lowers a counter weight Q and causes the cam or eccentric M to revolve in one direction or the other; such revolution of the cam or eccentric M raises or lowers the end of the lever R bearing thereon and enables the admission cam *n* to open the admission valve *t* at a point more or less advanced in the course of the piston, according to the variations on the load or charge of the motor.

The lever *r* of the exhaust valve F pivots on *i* under the action of its cam *m* and determines the exhaust of the mixture of gas and steam at a suitable moment.

If the hereinbefore described motor is arranged in a horizontal position, the general construction remains the same with the exception of the arrangement of certain parts. The compressor may be integrally combined with the motor of horizontal or vertical type operating a common shaft.

Motors of the kind described may be arranged as single action or two stroke motors, the first period being that of the admission of the mixture to the cylinder and its expansion, and the second that of the discharge of the exhaust gases. For that matter, a double action motor having admission at both ends of the cylinder might equally well be constructed, that is to say a motor of the usual type of steam engines but adapted to work by means of a mixture of gas and steam brought to a temperature exceeding 300°.

Having thus described my invention, I claim as new, and desire to secure by Letters Patent:—

1. An apparatus for utilizing the heat of combustion and steam power, comprising a combustion chamber, injectors for air, steam and fuel within the combustion chamber, a pipe leading from the combustion chamber, a boiler inclosing the combustion chamber, a steam collector communicating with the boiler and inclosing said pipe, valves for the injectors, and means for controlling said valves in unison.

2. An apparatus for utilizing the heat of combustion and steam power, comprising a combustion chamber, and a plurality of injectors for the fuel, the air, and the steam, needle valves for controlling the injectors, said valves having spindles projecting from the injectors, radial handles on the spindles, a ring to which the handles are connected, said ring being provided with oblique slots, and fixed means engaging the slots whereby the turning of the ring will operate said needle valves.

3. In a device of the class described, a plurality of parallel injectors for steam, air and fuel, valves provided with spindles for controlling the injectors, radially arranged handles connected with the free ends of the spindles, and a ring connected with all the handles for operating the valves.

4. The combination with a motor, of a combustion chamber, a plurality of injectors for steam, air and fuel delivering to the combustion chamber, valves for controlling the injectors, means for controlling the valves in unison, a boiler inclosing the combustion chamber, and a steam collector communicating with the boiler and inclosing the discharge pipe of the combustion chamber.

In witness whereof I have hereunto set my hand in presence of two witnesses.

THEODOR SCHTSCHERBAKOFF.

Witnesses:
GERTRUDE LATIMER,
M. LELONRIFF.